US008830920B2

(12) United States Patent
Dekorsy et al.

(10) Patent No.: US 8,830,920 B2
(45) Date of Patent: Sep. 9, 2014

(54) RESOURCE BLOCK REUSE FOR COORDINATED MULTI-POINT TRANSMISSION

(75) Inventors: Armin Dekorsy, Nuremberg (DE); Wolfgang Granzow, Nuremberg (DE); Lu Zhao, Erlangen (DE); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 12/817,001

(22) Filed: Jun. 16, 2010

(65) Prior Publication Data

US 2010/0322171 A1    Dec. 23, 2010

Related U.S. Application Data

(60) Provisional application No. 61/187,804, filed on Jun. 17, 2009.

(51) Int. Cl.
*H04W 4/00* (2009.01)
*H04W 72/00* (2009.01)
(Continued)

(52) U.S. Cl.
CPC ......... *H04W 72/042* (2013.01); *H04B 17/0077* (2013.01); *H04B 17/0057* (2013.01); *H04B 7/0621* (2013.01); *H04W 72/04* (2013.01); *H04W 24/10* (2013.01); *H04W 72/085* (2013.01); *H04W 24/00* (2013.01); *H04W 28/16* (2013.01); *H04B 7/0632* (2013.01); *H04B 7/0626* (2013.01); *H04W 28/04* (2013.01)
USPC .......................................... 370/329; 370/341

(58) Field of Classification Search
None
See application file for complete search history.

(56) References Cited

U.S. PATENT DOCUMENTS 6,334,057 B1 * 12/2001 Malmgren et al. ............ 455/450
2002/0163900 A1   11/2002 Hiramatsu et al.
(Continued)

FOREIGN PATENT DOCUMENTS

CN          1719929 A     1/2006
EP          1424865       6/2004
(Continued)

OTHER PUBLICATIONS

International Search Report and Written Opinion—PCT/US2010/039084, International Search Authority—European Patent Office—Oct. 25, 2010.
(Continued)

*Primary Examiner* — Chirag Shah
*Assistant Examiner* — Srinivasa Reddivalam
(74) *Attorney, Agent, or Firm* — Dalei Dong

(57) ABSTRACT

Methods, apparatus and computer program products are provided to improve the efficiency of resource allocation in wireless communication networks. In one provided embodiment, a wireless communication device determines a received signal strength of each of a number of signals received from a number of transmission sectors, provides first channel information for first signals including a signal having a highest received signal strength and signals having a received signal strength above a specified level relative to the highest received signal strength, provides second channel information for second signals including signals having a received signal strength below the specified level, and receives an allocation of one or more resource blocks from assigned transmission sectors based on a ranking of the first channel information, whereby the one or more resource blocks are reallocated to another wireless communication device, from another transmission sector, based on the second channel information. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

36 Claims, 7 Drawing Sheets

(51) Int. Cl.

| | | |
|---|---|---|
| *H04W 72/04* | (2009.01) | |
| *H04B 7/06* | (2006.01) | |
| *H04W 28/04* | (2009.01) | |
| *H04B 17/00* | (2006.01) | |
| *H04W 24/10* | (2009.01) | |
| *H04W 72/08* | (2009.01) | |
| *H04W 24/00* | (2009.01) | |
| *H04W 28/16* | (2009.01) | |

(56) References Cited

U.S. PATENT DOCUMENTS

| | | | |
|---|---|---|---|
| 2005/0265288 A1 | 12/2005 | Liu et al. | |
| 2008/0291856 A1* | 11/2008 | Li et al. | 370/311 |
| 2010/0291936 A1* | 11/2010 | Zangi et al. | 455/450 |
| 2013/0242776 A1* | 9/2013 | Kazmi et al. | 370/252 |

FOREIGN PATENT DOCUMENTS

| | | |
|---|---|---|
| JP | 2002530958 A | 9/2002 |
| KR | 20090032628 A | 4/2009 |
| WO | WO9905878 A1 | 2/1999 |
| WO | WO0001188 | 1/2000 |
| WO | WO0030388 | 5/2000 |
| WO | WO0118978 | 3/2001 |
| WO | WO0158201 | 8/2001 |
| WO | WO0207366 | 1/2002 |

OTHER PUBLICATIONS

LG Electronics: "Mixed CoMP Operation", 3GPP TSG RAN WG1 Meeting #57, San Francisco, USA, R1-092114, May 4-8, 2009.
Nokia Siemens Networks: "CoMP cell set selection and performance evaluation considerations", 3GPP TSG-RAN WG1#57, San Franciso, US, R1-091759, pp. 5, May 4-8, 2009.
Taiwan Search Report—TW099119707—TIPO—Apr. 16, 2013.

* cited by examiner

RESOURCE BLOCK REUSE FOR COORDINATED MULTI-POINT TRANSMISSION

The present application claims priority to U.S. Provisional Patent Application Ser. No. 61/187,804, entitled "Resource Block Reuse within a Cluster for Coordinated Multi-Point Transmission," filed Jun. 17, 2009 the entirety of which is hereby incorporated by reference.

FIELD OF INVENTION

The present invention relates generally to the field of wireless communications and, more particularly, to devices and methods for improving resource allocation in wireless communication networks.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Conventional wireless networks are configured with multiple, geographically dispersed antennas (access points), serving multi-sector cells and connected to a central baseband processing unit, whereby communication links with a mobile device (user equipment, or UE) can be transferred between sectors served by a single access point and handed-off between adjacent sectors served by different access points. This configuration of network topology and control lends itself to the use of coordinated multi-point transmission (CoMP) to improve signal quality and to increase data rates. Coordinating the transmission from multiple geographically dispersed access points can be used to increase the signal-to-noise ratio at a UE.

For example, coordinated multi-point transmission is considered for LTE-Advanced wireless communication systems by $3^{rd}$ Generation Partnership Project (3GPP) Technical Requirement TR 36.814, "Further Advancements for E-UTRA Physical Layer Aspects (Release 9)", to improve cell edge data throughput and average spectral efficiency. One proposed type of CoMP is Joint Processing/Transmission (JP/T) where multiple access points, serving a cluster of contiguous sectors, transmit data to a single CoMP capable UE using the same physical resource block (PRB), where for LTE-Advanced a PRB is defined as a particular set of OFDM (orthogonal frequency division multiplex) sub-carriers in a designated time slot, using RAKE receiver technology to combine signals with different arrival times. The allocation of the same physical resource block to a UE from multiple access points serves to improve the signal quality at the UE being served by CoMP-JP/T, but the allocated PRBs are not available to serve other UEs in the cluster of sectors because there is no mechanism for the reallocation of the PRBs to UEs in sectors of the cluster served by other access points.

SUMMARY

The disclosed embodiments relate to methods, apparatus and computer program products that improve the efficiency of resource allocation in wireless communication networks.

In one embodiment, a method in a wireless communication device includes determining a received signal strength of each of a plurality of signals received from a plurality of transmission sectors comprising a cluster of sectors, providing first channel information for first signals, the first signals comprising a signal having a highest received signal strength and signals having a received signal strength above a specified level relative to the highest received signal strength, providing second channel information for second signals, the second signals comprising signals having a received signal strength below the specified level, and receiving an allocation of one or more resource blocks from assigned transmission sectors based on a ranking of the first channel information, whereby the one or more resource blocks are reallocated to another wireless communication device, from another transmission sector, based on the second channel information.

Other provided embodiments include wireless communication devices and computer program products configured to perform the described method.

In another embodiment, a method in a wireless network includes determining a received signal strength, at a first wireless communication device in a first sector of a cluster of sectors, of each of a plurality of signals received from a plurality of transmission points in the cluster of sectors; receiving first channel information from the first wireless communication device, at a first transmission point in the cluster of sectors, for first signals received by the first wireless communication device comprising a signal having a highest received signal strength and signals having a received signal strength above a specified level relative to the highest received signal strength; receiving second channel information from the first wireless communication device, at the first transmission point, for second signals received by the first wireless communication device comprising signals having a received signal strength below the specified level; assigning transmission points including the first transmission point to the first wireless communication device and allocating resource blocks from the transmission points to the first wireless communication device, based on the first channel information; and reallocating the resource blocks to a second wireless communication device, in a second sector of the cluster of sectors, from an other transmission point in the cluster of sectors, based on the second channel information.

Other provided embodiments include wireless network devices and computer program products configured to perform the described method.

BRIEF DESCRIPTION OF THE DRAWINGS

Provided embodiments are illustrated by way of example, and not of limitation, in the figures of the accompanying drawings in which.

DETAILED DESCRIPTION

Figure 1:
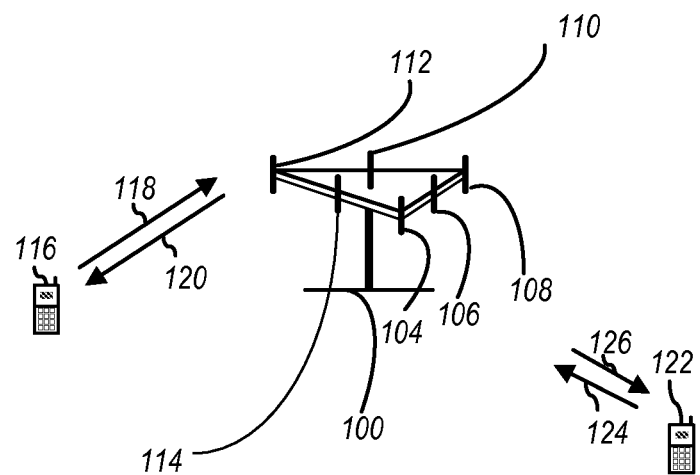
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile, wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of an access point, node, Node B, evolved NodeB (eNB), transmission point or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one of more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 and 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector or transmission sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
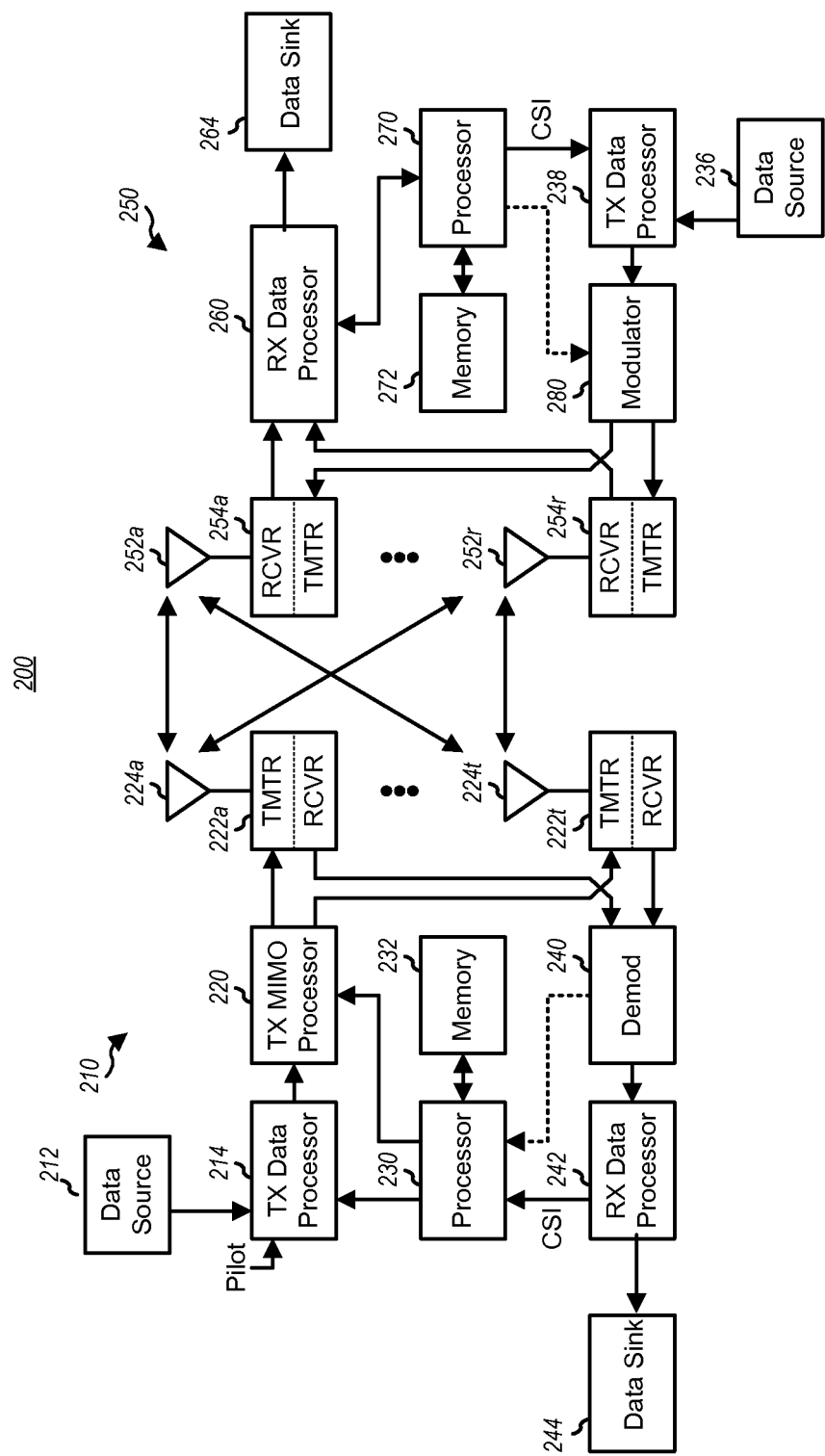
FIG. 2 illustrates a block diagram of a communication system.

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform FRC Fixed reference channel
FS1 Frame structure type 1
FS2 Frame structure type 2
GSM Global system for mobile communication,
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated; embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes, and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNode B) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO system communication 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability to the communication channel. In transmit diversity systems each of the signals transmitted from the transmitter system antennas 224a through 224t will experience a different interference environment (fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

Figure 3:
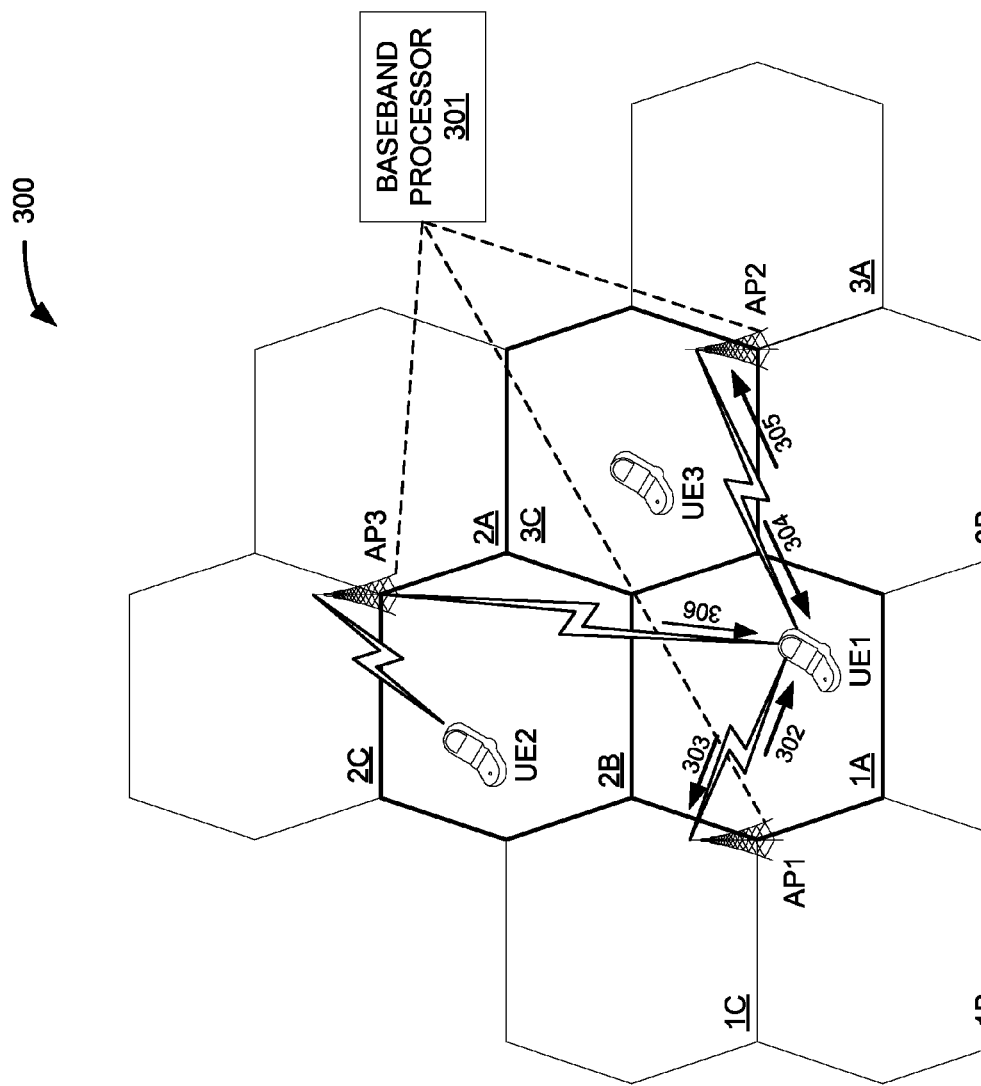
FIG. 3 illustrates a cluster of sectors exemplifying resource block reuse in one embodiment.

FIG. 3 illustrates a portion of a wireless network 300 exemplifying resource block reuse according to one embodiment. In FIG. 3, three exemplary access points (also known as transmission points) AP1, AP2 and AP3 each serve three primary sectors and are managed by a baseband processor 301. Baseband processor 301 may be, for example, a component, module or subsystem of RX data processor 242 or processor 230 depicted in FIG. 2. Baseband processor 301 is in communication with access points AP1, AP2 and AP3, which serve a plurality of sectors. For example, access point AP1 serves sectors 1A, 1B and 1C, access point AP2 serves sectors 2A, 2B and 2C; and access point AP3 serves sectors 3A, 3B and 3C. In particular, sectors 1A, 2B and 3C comprise a cluster of contiguous sectors where each sector is a primary sector served by one of the three access points. In other embodiments, the access points may each serve fewer than three sectors or more than three sectors. It will be appreciated that a UE in one sector of the cluster (e.g., UE1) may receive signals from any of the access points associated with the cluster, where the strength and quality of the signals will depend on the prevailing channel conditions. In the following discussion, it is assumed that normal call procedures according to, for example, 3GPP Technical Specification TS 36.331, "E-UTRA Radio Resource Control Protocol Specification," are used to allow UEs capable of coordinated multi-point transmission to establish communication with multiple access points.

In FIG. 3, UE1 in sector 1A may be a CoMP capable device. UE1 may receive signals from access point AP1 on a first downlink communication channel 302, signals from access point AP2 on a second downlink communication channel 304 and signals from access point AP3 on a third downlink communication channel 306. UE1 may be configured to determine the signal strength (e.g., reference signal received power, or RSRP) of each received signal and to separate the received signals into two groups based on the received signal strengths.

The first group of signals (first signals) includes the signal with the highest received signal strength (maxRSRP) and signals with a received signal strength above a power threshold defined as a specified level relative to the highest received signal strength. For example, the specified level may be X decibels below the highest received signal strength, so that any signal with a received signal strength greater than the power threshold of maxRSRP-X db will be one of the first signals. Typically, the signal with the highest received signal strength will be the signal from the access point closest to the UE (e.g., access point AP1 with respect to UE1 in FIG. 3), but this may not always be the case depending on channel conditions and the transmit power control algorithms used in the network.

The second group of signals (second signals) includes signals with received signal strengths below the power threshold (e.g., less than maxRSRP-Xdb). These signals are from transmission sectors classified as low interference sectors relative to the UE.

In FIG. 3, for example, UE1 may determine that the signal from AP1 has the highest signal strength and that the signal from AP2 is above the power threshold and is therefore in the first group along with the signal from AP1. UE1 may also determine that the signal received from AP3 is below the power threshold, and therefore is in the second group of signals.

UE1 provides channel information about the first signals (first channel information) to the baseband processor 301 on an uplink channel through the access point providing the highest signal strength to the UE (e.g., on uplink 303 to AP1). In one embodiment, the first channel information may include channel state information (CSI) and a transmission sector index for each of the received signals. The transmission sector index is included in each signal received by the UE and identifies the access point and the transmission sector where the received signal originated. The first channel information may be provided, for example, on a physical uplink control channel (PUCCH) or a physical uplink shared channel (PUSCH). In one embodiment, the CSI may comprise a channel quality indicator (CQI) for each received downlink signal, which may be provided on a channel quality indicator channel (CQICH), for example. The channel quality indicator may point to a table in the baseband processor 301 that includes a set of pre-defined modulation schemes and coding rate combinations corresponding to various channel conditions (e.g., interference, fading rates and multi-path conditions). UE1 may also notify the baseband processor 301 of UE1's capacity to operate in a CoMP communication mode.

UE1 provides channel information about the second signals (second channel information) on the same uplink channel (e.g., uplink channel 303) that includes a transmission sector index for each of the second signals (e.g., the signal from AP3).

Based on the first channel information received from UE1, and the CoMP capability of UE1, the baseband processor 301 may be configured to rank the first signals (e.g., determine transmission mode based on the CQI) and to assign the access points associated with the first signals to UE1. UE1 may then receive an allocation of physical resource blocks (PRBs) from AP1 and AP2 based on the assignments and rankings. It will be appreciated that the use of two access points for coordinated multi-point transmission, as described above, is only exemplary and that more than two access points may be employed in other embodiments.

Based on the second channel information, the baseband processor 301 can determine that a transmission point associated with the second signals (e.g., AP3) is a low interference sector (e.g., relative to UE1). Based on that determination, the baseband processor 301 may reallocate the same physical resource blocks (e.g., the PRBs already allocated to UE1) to another UE (e.g., UE2) in the low interference sector (e.g., sector 2B).

Figure 4:
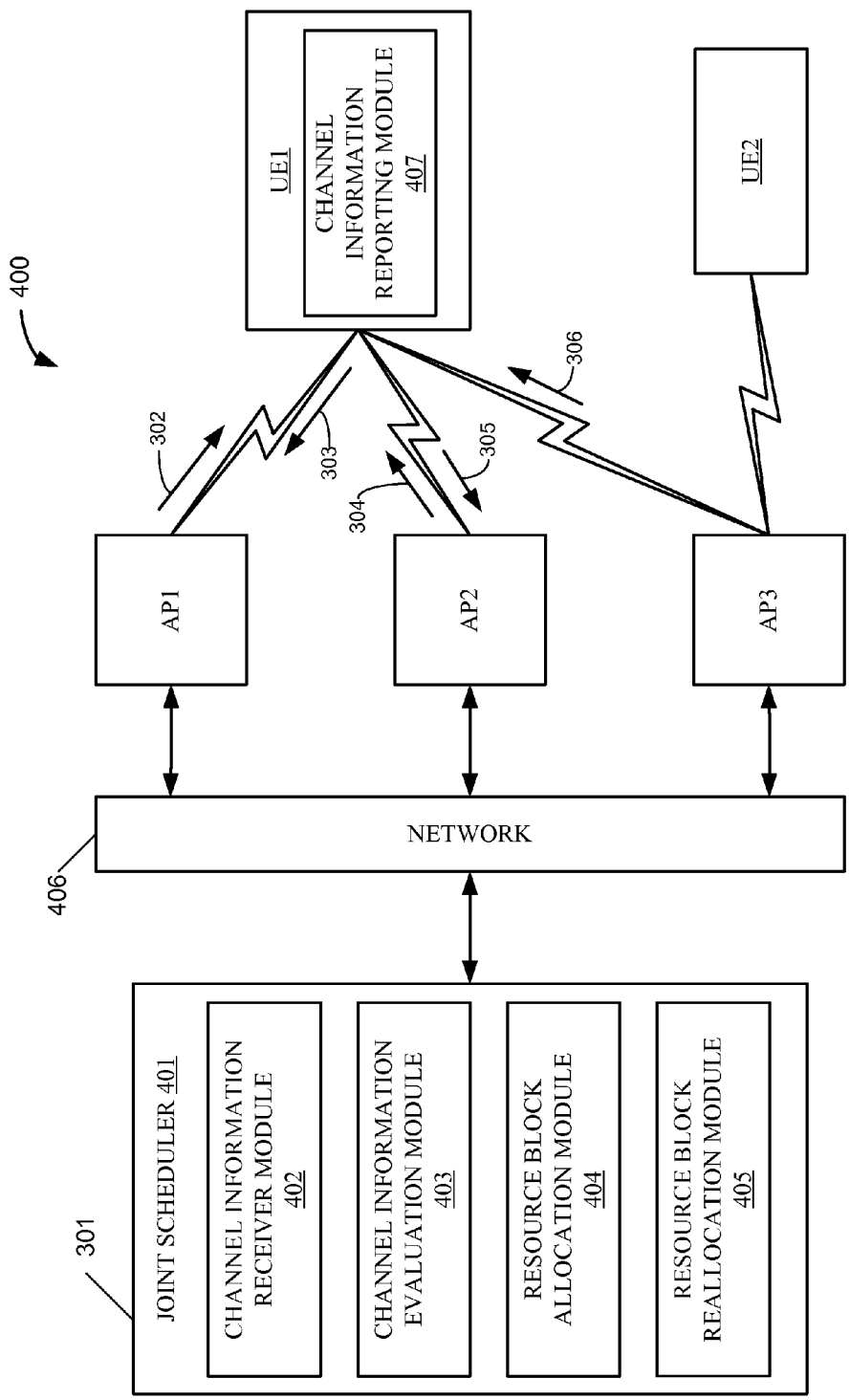
FIG. 4 is a block diagram illustrating resource block reuse in one embodiment.

FIG. 4 is a block diagram illustrating the operation of a wireless network 400 in one embodiment. In FIG. 4, wireless network 400 includes at least access points AP1, AP2 and AP3 as described above, where each access point is configured to communicate with CoMP capable mobile devices, such as UE1 and with legacy mobile devices without CoMP capability. Each access point is coupled to the baseband processor 301 through a network 406. The network 406 may be, for example, the Internet, a private wide area network (such as a fiber optic, microwave or wired network), a public switched telecommunications network or any combination thereof As illustrated in FIG. 4, UE1 may include a channel information reporting module to report the first channel information and the second channel information to the baseband processor 301 via an access point providing the strongest signal to UE1.

Baseband processor 301 may include a joint scheduler module 401 configured to manage resource allocation among access points and UEs. Joint scheduler 401 may include a channel information receiver module 402 configured to receive first channel information and second channel information, as described above, from a CoMP capable UE such as UE1.

Joint scheduler 401 may also include a channel information evaluation module 403 configured to evaluate first channel information and second channel information from UEs within the cluster of sectors.

Joint scheduler 401 may also include a resource block allocation module 404 configured to allocate physical resource blocks to a first UE, such as UE1, from two or more access points (e.g., AP1 and AP2), based on first channel information, when the UE is capable of operating in a coordinated multi-point transmission mode.

Joint scheduler 401 may also include a resource block reallocation module 405 configured to reallocate the same physical resource blocks from another access point in the cluster of sectors (e.g., AP3), to a second UE (such as UE2) based on the second channel information.

Figure 5:
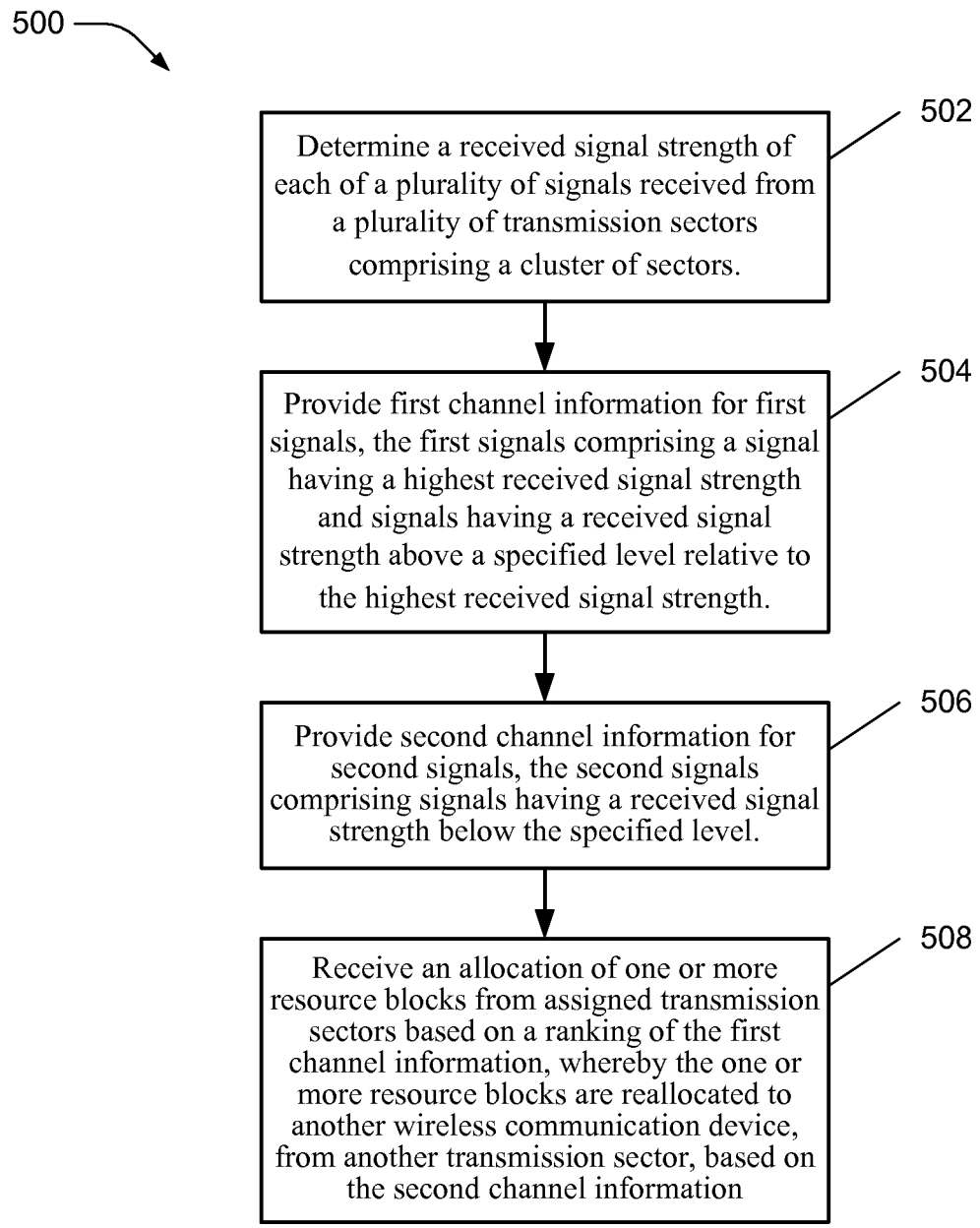
FIG. 5 is a flowchart illustrating a method of resource block reuse in one embodiment.

FIG. 5 is a flowchart 500 illustrating a method in a wireless communication device (e.g., UE1) according to one embodiment. In operation 502, the wireless communication device determines a received signal strength of each of a plurality of signals received from a plurality of transmission sectors comprising a cluster of sectors. In operation 504, the wireless communication device provides first channel information for first signals, the first signals comprising a signal having a highest received signal strength and signals having a received signal strength above a specified level relative to the highest received signal strength. In operation 506, the wireless communication device provides second channel information for second signals, the second signals comprising signals having a received signal strength below the specified level. In operation 508, the wireless communication device receives an allocation of one or more resource blocks from assigned transmission sectors based on a ranking of the first channel information, whereby the one or more resource blocks are reallocated to another wireless communication device, from another transmission sector, based on the second channel information.

Figure 6:
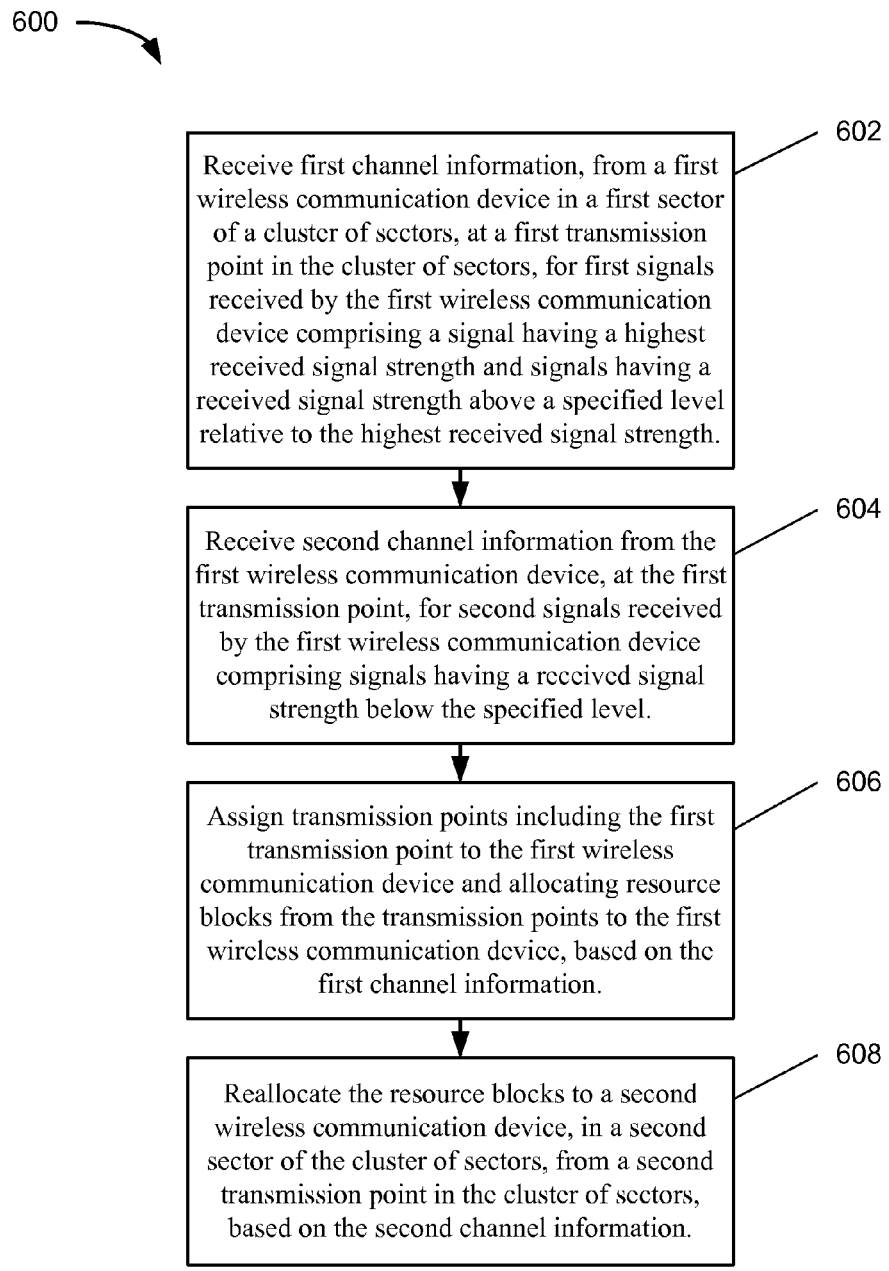
FIG. 6 is a flowchart illustrating a method of resource block reuse in another embodiment.

FIG. 6 is a flowchart 600 illustrating a method in a wireless communication network in one embodiment. In operation 602, the wireless network receives first channel information from a first wireless communication device in a first sector of a cluster of sectors, at a first transmission point in the cluster of sectors, for first signals received by the first wireless communication device comprising a signal having a highest received signal strength and signals having a received signal strength above a specified level relative to the highest received signal strength In operation 604, the wireless network receives second channel information from the first wireless communication device, at the first transmission point, for second signals received by the first wireless communication device comprising signals having a received signal strength below the specified level. In operation 606, the wireless network assigns transmission points including the first transmission point to the first wireless communication device and allocates resource blocks from the transmission points to the first wireless communication device, based on the first channel information. In operation 608, the wireless network reallocates the resource blocks to a second wireless communication device, in a second sector of the cluster of sectors, from a second transmission point in the cluster of sectors, based on the second channel information.

Figure 7:
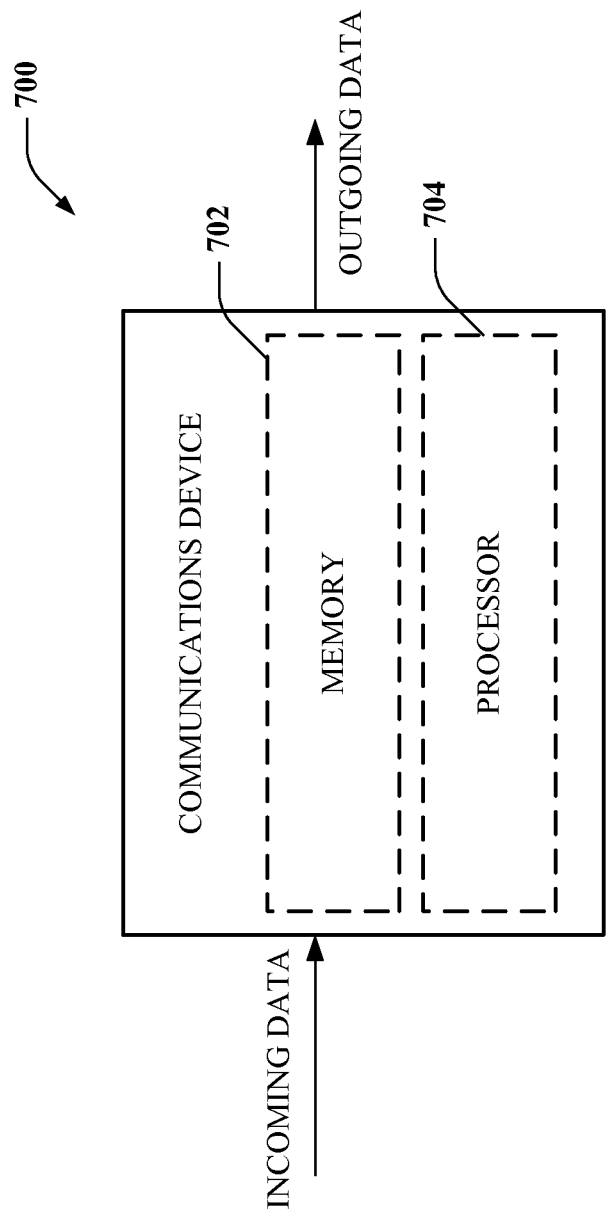
FIG. 7 illustrates an apparatus within which various embodiments may be implemented.

FIG. 7 illustrates an apparatus 700 within which various disclosed embodiments may be implemented. In particular, the apparatus 700 that is shown in FIG. 7 may comprise at least a portion of an access point (such as access points AP1, AP2 and AP3 depicted in FIGS. 3 and 4), at least a portion of a user equipment (such as the user equipment UE1 and UE2 that are depicted in FIGS. 3 and 4), at least a portion of a baseband processor (such as baseband processor depicted in FIGS. 3 and 4) and/or at least a portion of a transmitter system or a receiver system (such as the transmitter system 210 and the receiver system 250 that are depicted in FIG. 2). The apparatus 700 that is depicted in FIG. 7 can be resident within a wireless network and receive incoming data via, for example, one or more receivers and/or the appropriate reception and decoding circuitry (e.g., antennas, transceivers, demodulators and the like). The apparatus 57 that is depicted in FIG. 7 can also transmit outgoing data via, for example, one or more transmitters and/or the appropriate encoding and transmission circuitry (e.g., antennas, transceivers, modulators and the like). Additionally, or alternatively, the apparatus 700 that is depicted in FIG. 7 may be resident within a wired network.

FIG. 7 further illustrates that the apparatus 700 can include a memory 702 that can retain instructions for performing one or more operations, such as signal conditioning, analysis and the like. Additionally, the apparatus 700 of FIG. 7 may include a processor 704 that can execute instructions that are stored in the memory 702 and/or instructions that are received from another device. The instructions can relate to, for example, configuring or operating the apparatus 700 or a related communications apparatus. It should be noted that while the memory 702 that is depicted in FIG. 7 is shown as a single block, it may comprise two or more separate memories that constitute separate physical and/or logical units. In addition, the memory while being communicatively connected to the processor 704, may reside fully or partially outside of the apparatus 700 that is depicted in FIG. 7. It is also to be understood that one or more components or modules, such as the channel information reporting module 407, the channel information receiver module 402, the channel information evaluation module 403, the resource block allocation module 404 and the resource block reallocation module 405, that are shown in FIG. 4, can exist within a memory such as memory 702.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 700 of FIG. 7 can be employed with a user equipment or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc. that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a user equipment (e.g. 308 FIG. 3, 508 FIG. 8, 702 FIG. 7) in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 404 FIG. 10). In the alternative, the processor and the storage medium may reside as discrete components in a user equipment (e.g. 404 FIG. 10). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method in a wireless communication device, comprising:
    determining, by the wireless communication device, a received signal strength of each of a plurality of signals received from a plurality of transmission sectors comprising a cluster of sectors;
    providing, by the wireless communication device, first channel information for first signals, the first signals comprising a signal having a highest received signal strength and signals having a received signal strength above a specified level relative to the highest received signal strength;
    providing, by the wireless communication device, second channel information for second signals, the second signals comprising signals having a received signal strength below the specified level; and
    receiving, by the wireless communication device, an allocation of one or more resource blocks from assigned transmission sectors based on a ranking of the first channel information, whereby the one or more resource blocks are reallocated to another wireless communication device, from another transmission sector, based on the second channel information.

2. The method of claim 1,
    wherein the first channel information comprises channel state information and a transmission sector index for each of the first signals, and
    wherein the second channel information comprises a transmission sector index for each of the second signals.

3. The method of claim 2, wherein the channel state information comprises a channel quality indicator.

4. The method of claim 1, wherein the first channel information and the second channel information are provided to a transmission sector that transmits the signal having the highest received signal strength at the wireless communication device.

5. The method of claim 1, wherein the wireless communication device is located in a first transmission sector of the cluster of sectors and the other wireless device is located in another transmission sector in the cluster of sectors.

6. The method of claim 1, wherein the allocation of one or more resource blocks from assigned transmission sectors is configured to support coordinated multi-point transmission with the wireless communication device.

7. A wireless communication device, comprising at least one processor configured to:

determine, at the wireless communication device, a received signal strength of each of a plurality of signals received from a plurality of transmission sectors comprising a cluster of sectors;

provide, by the wireless communication device, first channel information for first signals, the first signals comprising a signal having a highest received signal strength and signals having a received signal strength above a specified level relative to the highest received signal strength;

provide, by the wireless communication device, second channel information for second signals, the second signals comprising signals having a received signal strength below the specified level;

receive, at the wireless communication device, an allocation of one or more resource blocks from assigned transmission sectors based on a ranking of the first channel information, whereby the one or more resource blocks are reallocated to another wireless communication device, from another transmission sector, based on the second channel information, and wherein the at least one processor is coupled to a memory.

8. The wireless communication device of claim 7, wherein the first channel information comprises channel state information and a transmission sector index for each of the first signals, and wherein the second channel information comprises a transmission sector index for each of the second signals.

9. The wireless communication device of claim 8, wherein the channel state information comprises a channel quality indicator.

10. The wireless communication device of claim 7, wherein the at least one processor is further configured to provide the first channel information and the second channel information to a transmission sector that transmits the signal having the highest received signal strength at the wireless communication device.

11. The wireless communication device of claim 7, wherein the wireless communication device is located in a first transmission sector of the cluster of sectors and the other wireless device is located in another transmission sector in the cluster of sectors.

12. The wireless communication device of claim 7, wherein the allocation of one or more resource blocks from assigned transmission sectors is configured to support coordinated multi-point transmission with the wireless communication device.

13. A computer program product, embodied on a non-transitory computer readable medium in a wireless communication device, comprising:

program code for determining, by the wireless communication device, a received signal strength of each of a plurality of signals received from a plurality of transmission sectors comprising a cluster of sectors;

program code for providing, by the wireless communication device, first channel information for first signals, the first signals comprising a signal having a highest received signal strength and signals having a received signal strength above a specified level relative to the highest received signal strength;

program code for providing, by the wireless communication device, second channel information for second signals, the second signals comprising signals having a received signal strength below the specified level; and program code for receiving, at the wireless communication device, an allocation of one or more resource blocks from assigned transmission sectors based on a ranking of the first channel information, whereby the one or more resource blocks are reallocated to another wireless communication device, from another transmission sector, based on the second channel information.

14. The computer program product of claim 13, wherein the first channel information comprises channel state information and a transmission sector index for each of the first signals, and wherein the second channel information comprises a transmission sector index for each of the second signals.

15. The computer program product of claim 14, wherein the channel state information comprises a channel quality indicator.

16. The computer program product of claim 13, wherein the allocation of one or more resource blocks from assigned transmission sectors is configured to support coordinated multi-point transmission with the wireless communication device.

17. A wireless communication device, comprising:

means for determining, by the wireless communication device, a received signal strength of each of a plurality of signals received from a plurality of transmission sectors comprising a cluster of sectors;

means for providing, by the wireless communication device, first channel information for first signals, the first signals comprising a signal having a highest received signal strength and signals having a received signal strength above a specified level relative to the highest received signal strength;

means for providing, by the wireless communication device, second channel information for second signals, the second signals comprising signals having a received signal strength below the specified level; and means for receiving, at the wireless communication device, an allocation of one or more resource blocks from assigned transmission sectors based on a ranking of the first channel information, whereby the one or more resource blocks are reallocated to another wireless communication device, from another transmission sector, based on the second channel information.

18. The wireless communication device of claim 17, wherein the first channel information comprises channel state information and a transmission sector index for each of the first signals, and wherein the second channel information comprises a transmission sector index for each of the second signals.

19. The wireless communication device of claim 18, wherein the channel state information comprises a channel quality indicator.

20. The wireless communication device of claim 17, wherein the allocation of one or more resource blocks from assigned transmission sectors is configured to support coordinated multi-point transmission with the wireless communication device.

21. A method in a wireless network, comprising:

receiving first channel information, from a first wireless communication device in a first sector of a cluster of sectors, at a first transmission point in the cluster of sectors, for first signals received by the first wireless communication device comprising a signal having a highest received signal strength and signals having a received signal strength above a specified level relative to the highest received signal strength;

receiving second channel information from the first wireless communication device, at the first transmission point, for second signals received by the first wireless communication device comprising signals having a received signal strength below the specified level;

assigning transmission points including the first transmission point to the first wireless communication device and allocating resource blocks from the transmission points to the first wireless communication device, based on the first channel information; and reallocating the resource blocks to a second wireless communication device, in a second sector of the cluster of sectors, from a second transmission point in the cluster of sectors, based on the second channel information.

22. The method of claim 21, wherein the first channel information comprises channel state information and a transmission sector index for each of the first signals, and wherein the second channel information comprises a transmission sector index for each of the second signals.

23. The method of claim 22, wherein the channel state information comprises a channel quality indicator.

24. The method of claim 21, wherein the assigning transmission points to the first wireless communication device is configured to support coordinated multi-point transmission with the first wireless communication device.

25. A wireless network device, comprising at least one processor configured to:

receive first channel information, from a first wireless communication device in a first sector of a cluster of sectors, at a first transmission point in the cluster of sectors, for first signals received by the first wireless communication device comprising a signal having a highest received signal strength and signals having a received signal strength above a specified level relative to the highest received signal strength;

receive second channel information from the first wireless communication device, at the first transmission point, for second signals received by the first wireless communication device comprising signals having a received signal strength below the specified level;

assign transmission points including the first transmission point to the first wireless communication device and allocate resource blocks from the transmission points to the first wireless communication device, based on the first channel information received from the first wireless communication device;

reallocate the resource blocks to a second wireless communication device, in a second sector of the cluster of sectors, from a second transmission point in the cluster of sectors, based on the second channel information received from the first wireless communication device, and wherein the at least one processor is coupled to a memory.

26. The wireless network device of claim 25, wherein the first channel information comprises channel state information and a transmission sector index for each of the first signals, and wherein the second channel information comprises a transmission sector index for each of the second signals.

27. The wireless network device of claim 26, wherein the channel state information comprises a channel quality indicator.

28. The wireless network device of claim 21, wherein assigning of the transmission points to the first wireless communication device is configured to support coordinated multi-point transmission with the first wireless communication device.

29. A computer program product, embodied on a non-transitory computer readable medium in a wireless network device, comprising:

program code for receiving first channel information, from a first wireless communication device in a first sector of a cluster of sectors, at a first transmission point in the cluster of sectors, for first signals received by the first wireless communication device comprising a signal having a highest received signal strength and signals having a received signal strength above a specified level relative to the highest received signal strength;

program code for receiving second channel information from the first wireless communication device, at the first transmission point, for second signals received by the first wireless communication device comprising signals having a received signal strength below the specified level;

program code for assigning transmission points including the first transmission point to the first wireless communication device and allocating resource blocks from the transmission points to the first wireless communication device, based on the first channel information received from the first wireless communication device; and program code for reallocating the resource blocks to a second wireless communication device, in a second sector of the cluster of sectors, from a second transmission point in the cluster of sectors, based on the second channel information received from the first wireless communication device.

30. The computer program product of claim 29, wherein the first channel information comprises channel state information and a transmission sector index for each of the first signals, and wherein the second channel information comprises a transmission sector index for each of the second signals.

31. The computer program product of claim 30, wherein the channel state information comprises a channel quality indicator.

32. The computer program product of claim 29, wherein the assigning transmission points to the first wireless communication device is configured to support coordinated multi-point transmission with the first wireless communication device.

33. A wireless network device, comprising:

means for receiving first channel information, from a first wireless communication device in a first sector of a cluster of sectors, at a first transmission point in the cluster of sectors, for first signals received by the first wireless communication device comprising a signal having a highest received signal strength and signals having a received signal strength above a specified level relative to the highest received signal strength;

means for receiving second channel information from the first wireless communication device, at the first transmission point, for second signals received by the first wireless communication device comprising signals having a received signal strength below the specified level;

means for assigning transmission points including the first transmission point to the first wireless communication device and allocating resource blocks from the transmission points to the first wireless communication device, based on the first channel information received from the first wireless communication device; and means for reallocating the resource blocks to a second wireless communication device, in a second sector of the cluster of sectors, from a second transmission point in the cluster of sectors, based on the second channel information received from the first wireless communication device.

34. The wireless network device of claim 33,
wherein the first channel information comprises channel state information and a transmission sector index for each of the first signals, and
wherein the second channel information comprises a transmission sector index for each of the second signals.

35. The wireless network device of claim 34, wherein the channel state information comprises a channel quality indicator.

36. The wireless network device of claim 33, wherein the assigning transmission points to the first wireless communication device is configured to support coordinated multi-point transmission with the first wireless communication device.

* * * * *